United States Patent [19]

Jones, Jr.

[11] Patent Number: 5,335,421
[45] Date of Patent: Aug. 9, 1994

[54] RULES

[76] Inventor: James F. Jones, Jr., 2108 Pear St., Michigan City, Ind. 46360

[21] Appl. No.: 93,343

[22] Filed: Jul. 19, 1993

[51] Int. Cl.⁵ .................................... G01B 3/02
[52] U.S. Cl. ........................... 33/494; 33/759; 33/679.1
[58] Field of Search .............. 33/483, 494, 759, 760, 33/679.1, 809, 293, 296

[56] References Cited

U.S. PATENT DOCUMENTS

| | | |
|---|---|---|
| 1,469,944 | 10/1923 | Merrill .................. 33/494 |
| 1,602,490 | 10/1926 | Homan .................. 33/494 |
| 1,687,429 | 10/1928 | Datson .................. 33/494 |
| 1,776,245 | 9/1930 | Barrett .................. 33/494 |
| 1,816,548 | 7/1931 | Robidoux ............... 33/494 |
| 2,077,828 | 4/1937 | Dombrowski ........... 33/494 |
| 2,561,020 | 7/1951 | Gerber .................. 33/494 |
| 4,547,969 | 10/1985 | Haack .................. 33/494 |
| 4,750,270 | 6/1988 | Kundikoff .............. 33/494 |
| 4,811,489 | 3/1989 | Walker .................. 33/494 |
| 4,951,397 | 8/1990 | Durio .................. 33/494 |

FOREIGN PATENT DOCUMENTS 15633 of 1912 United Kingdom ............ 33/494

*Primary Examiner*—Thomas B. Will
*Attorney, Agent, or Firm*—Lockwood, Alex, FitzGibbon & Cummings

[57] ABSTRACT

Rules, including rulers, yardsticks, measuring tapes and the like which are marked along opposite edges with inch, half-inch, quarter-inch, eighth-inch and sixteenth-inch graduations. One edge having the one-sixteenth inch graduations in a color different from all the other graduation markings on that edge and sequentially numbered within each inch in the same different color. The other edge not having one-sixteenth inch graduations and the eighth-inch graduations being in a different color from all the other graduations on that side and preferably different from the color of the one-sixteenth inch graduations and sequentially numbered within each inch in the same different color.

3 Claims, 1 Drawing Sheet

RULES

BACKGROUND AND DESCRIPTION OF THE INVENTION

My invention relates generally to improvements and innovations in rules for making measurements in inches and particularly in one-eighth and one-sixteenth fractions of inches. By the term "rule" or "rules", I intend to include rulers, yardsticks, tape measures, carpenter squares and the like.

It has been observed that there is a significant number of persons who are able to make measurements in inches, one-half inches and one-quarter inches but who have difficulty in making measurements in one-eighth and one-sixteenth inches. For example, if one of these persons sets out to cut off a board five feet, six inches and five sixteenths of an inch long from a longer board, he may become confused and cut the board either one-sixteenth of an inch long or one-sixteenth of an inch short. Similarly, the person is likely to cut off a board that is one-eighth of an inch long or one-eighth of an inch short.

The object of my invention, generally stated, is the provision of rules that minimize or eliminate the tendency of users to make inaccurate measurements when making measurements involving one-eighth inch or one-sixteenth inch graduations on the rule.

For a complete understanding of the nature and scope of my invention, reference may now be had to the following description of two embodiments thereof taken in connection with the accompanying drawings wherein.

Figure 1:
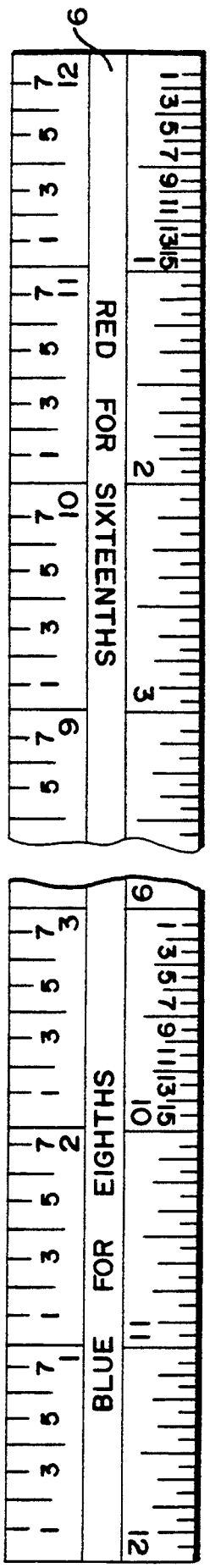
FIG. 1 is a plan view of a rule forming one embodiment of the invention.

Referring to FIG. 1, a rule is indicated generally at 5 therein which is in the form of a twelve inch ruler but which is representative of a yardstick, a tape measure or a carpenter's square and the like.

The top edge of the rule 5, as viewed in FIG. 1, is graduated in inches, one-half inches, one-quarter inches and one-eighth inches. All of the inch, half-inch and quarter-inch graduations on the top edge are in the same color which typically will be black. The one-eighth inch graduations are in a different color which, for example, may be blue. Within each inch, the one-eighth inch graduations are sequentially marked 1, 3, 5 and 7. The rule 5 has a median strip 6 which bears the legend "BLUE FOR EIGHTHS" which is right side up and readable when viewing the upper edge of the rule 5.

The lower edge of the rule 5 has inch, half-inch, quarter-inch, eighth-inch and sixteenth-inch graduations. All of these graduations are in the same color, for example, black, except for the one-sixteenth inch graduations which will be in a color different from black and also preferably different from blue or whatever color the eighth-inch graduations in the scale at the top edge of the rule 5 are in. The median strip 6 will also bear a legend, for example, "RED FOR SIXTEENTHS" which is readable only when viewing or facing toward the lower edge of the rule 5. Each of the one-sixteenth inch graduations within each inch on the lower edge of the rule 5 will be sequentially marked 1, 3, 5, 7, 9, 11, 13, 15.

Figure 2:
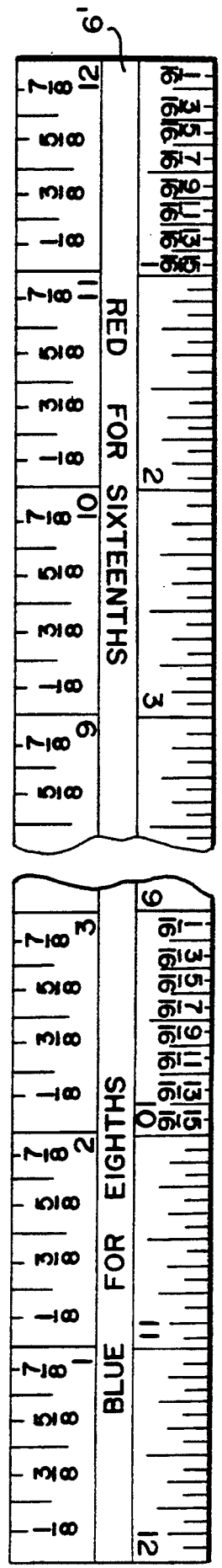
FIG. 2 is a plan view of a rule forming a second embodiment of the invention.

In FIG. 2, a ruler is indicated generally at 5' which has the same graduations and legends as the rule 5 in FIG. 1. However, in rule 5', the one-eighth inch graduations in the blue color within each inch of the rule are marked $\frac{1}{8}$, $\frac{3}{8}$, $\frac{5}{8}$ and $\frac{7}{8}$ sequentially. Likewise, the one-sixteenth inch graduations in red are marked 1/16, 3/16, 5/16, 7/16, 9/16, 11/16, 13/16 and 15/16.

As indicated above, the graduations on the rulers 5 and 5' in FIGS. 1 and 2, respectively, can be extended beyond 12 inches and applied to a yardstick, a carpenter's square, a tape measure or other rule.

What I claim is:

1. A rule the opposite edges of which are graduated with a median strip extending therebetween and the graduations on the rule being in inches and one-half, one-quarter, one-eighth and one-sixteenth fractions and indicated by parallel lines extending transversely of the rule, the inch, one-half inch, quarter-inch and one-eighth inch graduations along a first opposite edge being all in a first color and the one-sixteenth graduations being in a second color, the inch, one-half inch and one-quarter inch graduations along the second opposite edge being all in said first color and the one-eighth graduations being in a third color, and said median strip having thereon a first legend readable toward said first edge indicating that said second color indicates one-sixteenth inch graduations and a second legend readable toward said second edge indicating that said third color indicates one-eighth inch graduations.

2. The rule called for in claim 1 whereon inch graduations on said opposite edges are marked sequentially commencing with "1", and whereon, within each inch, said one-sixteen inch graduations in said second color on said first opposite edge are marked sequentially 1, 3, 5, 7, 9, 11, 13 and 15 in said second color and whereon, within each inch, said one-eighth inch graduations in said third color on said second opposite edge are marked sequentially 1, 3, 5 and 7 in said third color.

3. The rule called for in claim 1 whereon inch graduations on said opposite edges are marked sequentially commencing with "1" and whereon, within each inch, said one-sixteen inch graduations in said second color on said first opposite edge are marked sequentially 1/16, 3/16, 5/16, 7/16, 9/16, 11/16, 13/16 and 15/16 in said second color and whereon, within each inch, said one-eighth inch graduations in said third color on said second opposite edge are marked sequentially $\frac{1}{8}$, $\frac{3}{8}$, $\frac{5}{8}$ and $\frac{7}{8}$ in said third color.

* * * * *